(12) United States Patent
Raggam et al.

(10) Patent No.: US 8,552,841 B2
(45) Date of Patent: Oct. 8, 2013

(54) COMMUNICATION METHOD HAVING SELECTABLE RESPONSE SIGNAL STRENGTH LEVELS

(75) Inventors: Peter Raggam, St. Stefan (AT); Martin Buchsbaum, Graz (AT); Christian Pontesegger, Deutschlandsberg (AT); Martin Liebl, Thal Bei Graz (AT); Werner Drexel, Heiligenkreuz A W. (AT)

(73) Assignee: Infineon Technologies AG, Neubiberg (DE)

( * ) Notice: Subject to any disclaimer, the term of this patent is extended or adjusted under 35 U.S.C. 154(b) by 1037 days.

(21) Appl. No.: 12/116,811

(22) Filed: May 7, 2008

(65) Prior Publication Data

US 2009/0278665 A1 Nov. 12, 2009

(51) Int. Cl.
*H04B 7/00* (2006.01)

(52) U.S. Cl.
USPC ..... 340/10.5; 340/10.1; 340/10.32; 340/10.4; 340/7.32

(58) Field of Classification Search
USPC .............. 340/10.5, 10.1, 539.21, 539.3, 7.32, 340/10.31, 10.4, 10.32; 455/115.3, 574, 455/127.1, 127.5, 134, 513, 226.2
See application file for complete search history.

(56) References Cited

U.S. PATENT DOCUMENTS

| | | | | |
|---|---|---|---|---|
| 5,003,619 A | * | 3/1991 | Morris et al. | 455/69 |
| 5,778,309 A | * | 7/1998 | Tuttle et al. | 455/127.2 |
| 5,887,176 A | * | 3/1999 | Griffith et al. | 713/320 |
| 6,549,119 B1 | * | 4/2003 | Turner | 340/10.5 |
| 6,617,962 B1 | | 9/2003 | Horwitz et al. | |
| 7,023,342 B2 | | 4/2006 | Corbett et al. | |
| 7,054,595 B2 | | 5/2006 | Bann | |
| 7,239,884 B2 | * | 7/2007 | Khawand et al. | 455/522 |
| 7,623,036 B2 | * | 11/2009 | Onderko et al. | 340/572.1 |
| 7,693,119 B2 | * | 4/2010 | Lee et al. | 370/338 |
| 2006/0022800 A1 | | 2/2006 | Krishna et al. | |
| 2006/0022801 A1 | | 2/2006 | Husak et al. | |
| 2006/0116179 A1 | * | 6/2006 | Vensuna | 455/574 |
| 2007/0072565 A1 | * | 3/2007 | Yach | 455/127.1 |
| 2007/0149232 A1 | * | 6/2007 | Koslar | 455/522 |
| 2007/0290802 A1 | * | 12/2007 | Batra et al. | 340/10.1 |
| 2009/0027173 A1 | * | 1/2009 | Forster | 340/10.41 |

FOREIGN PATENT DOCUMENTS

WO WO-2005/022454 3/2005

OTHER PUBLICATIONS

ISO/IEC 18000-3-3, "Automatic Identification—Radio Frequency Identification for Item Management—Communications and Interfaces—Part 3: Physical Layer, Anti collision System and Protocol Values at 13.56 MHz Mode 3," 2001; pp. i-v and 1-38.

* cited by examiner

*Primary Examiner* — Hai Phan
*Assistant Examiner* — Peter Mehravari
(74) *Attorney, Agent, or Firm* — Schiff Hardin LLP

(57) ABSTRACT

A communication method in a system having a reader and at least one transceiver, the method including the reader selecting a response signal strength level from a plurality of response signal strength levels; and establishing communication between the reader and the at least one transceiver at the selected response signal strength level.

22 Claims, 4 Drawing Sheets

COMMUNICATION METHOD HAVING SELECTABLE RESPONSE SIGNAL STRENGTH LEVELS

FIELD OF THE INVENTION

The present invention relates generally to communication systems, and more specifically to a communication system with selectable response signal strength levels.

BACKGROUND OF THE INVENTION

A radio frequency identification (RFID) communication system is a wireless system having a reader and at least one tag. Communication interfaces between the reader and the tag have been described in, for example, ISO/IEC 18000-3, mode 2.

Each tag typically has a single chip with a memory, which stores data, and a radio transceiver or transponder. One tag format is a chip mounted on a plastic sheet that contains an antenna in the form of a small loop.

The reader, also called an interrogator, is a higher-power transceiver having a larger wideband antenna to interrogate the tag with an interrogation or carrier signal. Working with a computer system, such as a point of sale system or inventory control system, the reader stores the tag information and takes appropriate action, depending upon the application. It is also possible for the reader to write to the tag and change the tag's data.

A tag can be passive, semi-passive, or active. In the passive case, the tag obtains power from the RF signal received from the reader to power its circuitry. That is, a passive tag rectifies and filters the received signal into a DC signal that powers the circuitry. An active tag differs from a passive tag in that it has its own power source for boosting transmit power and storing more information.

RFID systems use transformer theory, with the reader antenna being the primary winding of the transformer, and the tag antenna the secondary winding. Signal strength at the tag is proportional to its distance from the reader, and thus the tag has to be placed in close proximity to the reader in order for the tag and the reader to communicate. A typical range is several inches, but the range varies with the frequency of operation as well as antenna size.

Data transfer methods in RFID systems vary depending on the application and type of coupling. Currently most RFID systems use amplitude shift keying (ASK). Another data transfer method is phase shift keying (PSK). When the reader is turned on, the tag powers up and waits for reader commands to be processed. Binary pulses representing the reply data modify the impedance of the tag's antenna, which in turn causes an amplitude shift in the carrier signal. The process loads and unloads the secondary winding of the tag to reflect an impedance back into the primary winding of the reader via the modulated carrier signal. The result is an AM signal decoded into a serial data signal by the reader.

RFID systems feature anti-collision resolution, as multiple tags powered up simultaneously within the reader's antenna field can interfere with one another. Many available schemes prevent such collisions. One scheme uses a time-division multiplexed arrangement, assigning each tag a time slot in which to transmit. Also, collisions can be resolved by muting all tags except the tag being read to ensure that no collision occurs. After a certain period, the muted tags are reactivated.

The response signal strength level of the tag is typically a low level to allow multi-channel operations, e.g. eight channel operations, with minimal crosstalk between channels. This low response signal strength level requires expensive and highly sensitive readers to detect the tag's transmissions. Furthermore, the above described low response signal strength level is also used in single channel mode where crosstalk is nonexistent, thereby reducing the communication range of the system and resulting in potential loss of data when a tag is at or near the threshold of the communication range.

SUMMARY OF THE INVENTION

A communication method in a system having a reader and at least one transceiver, the method including the reader selecting a response signal strength level from a plurality of response signal strength levels; and establishing communication between the reader and the at least one transceiver at the selected response signal strength level.

BRIEF DESCRIPTION OF THE DRAWINGS

The same or corresponding components in the drawings are denoted by the same reference numerals.

DETAILED DESCRIPTION OF PREFERRED EMBODIMENTS OF THE INVENTION

By way of overview, the present invention is directed a communication system and method in which a reader selects a response signal strength (RSS) level from a plurality of RSS levels, and communication is established between the reader and at least one device at the selected RSS level. If the reader is not able to communicate with any devices at the selected RSS level, the reader can further select progressively higher RSS levels until communication between the reader and at least one device can be established.

Figure 1:
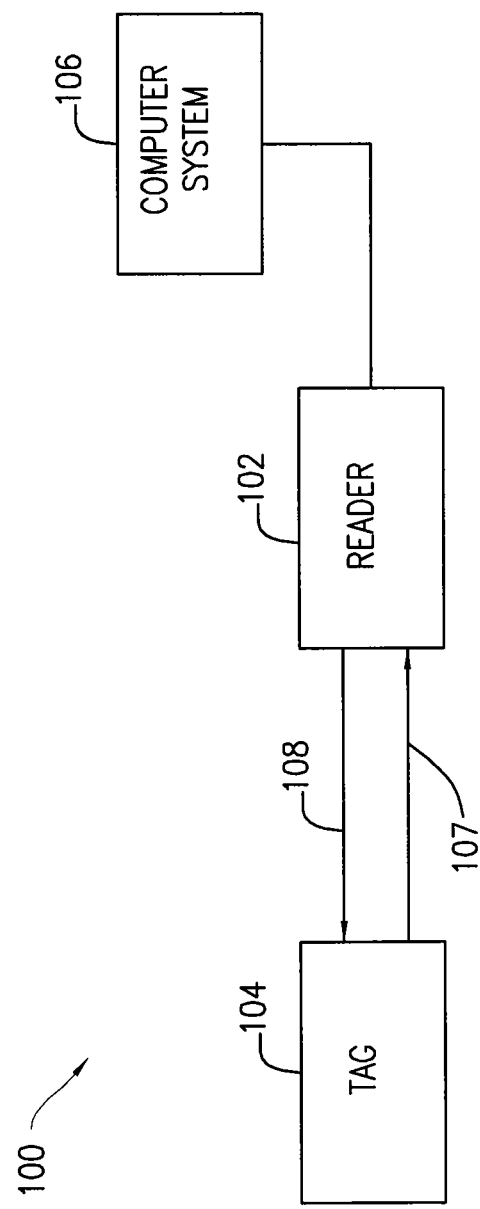
FIG. 1 is a block diagram of an RFID system in accordance with an embodiment of the present invention.

FIG. 1 illustrates an RFID system 100 in accordance with an embodiment of the present invention. RFID system 100 includes reader 102 and tag 104. Although only a single tag 104 is shown for the sake of simplicity, the system 100 can include any number of tags 104. Reader 102 transmits an interrogation or carrier signal 108, and tag 104 responds by transmitting a modulated version of the carrier signal 107. RFID system 100 may optionally include a computer system 106, such as a point of sale system or inventory control system, coupled to the reader 102.

Tag 104 includes different selectable RSS levels for modulating the carrier signal with the tag's reply data. Without a specific request from reader 102, tag 104 defaults to using a low RSS level that minimizes crosstalk. However, a lower RSS level results in a lower communication range between reader 102 and tag 104.

Figure 2:
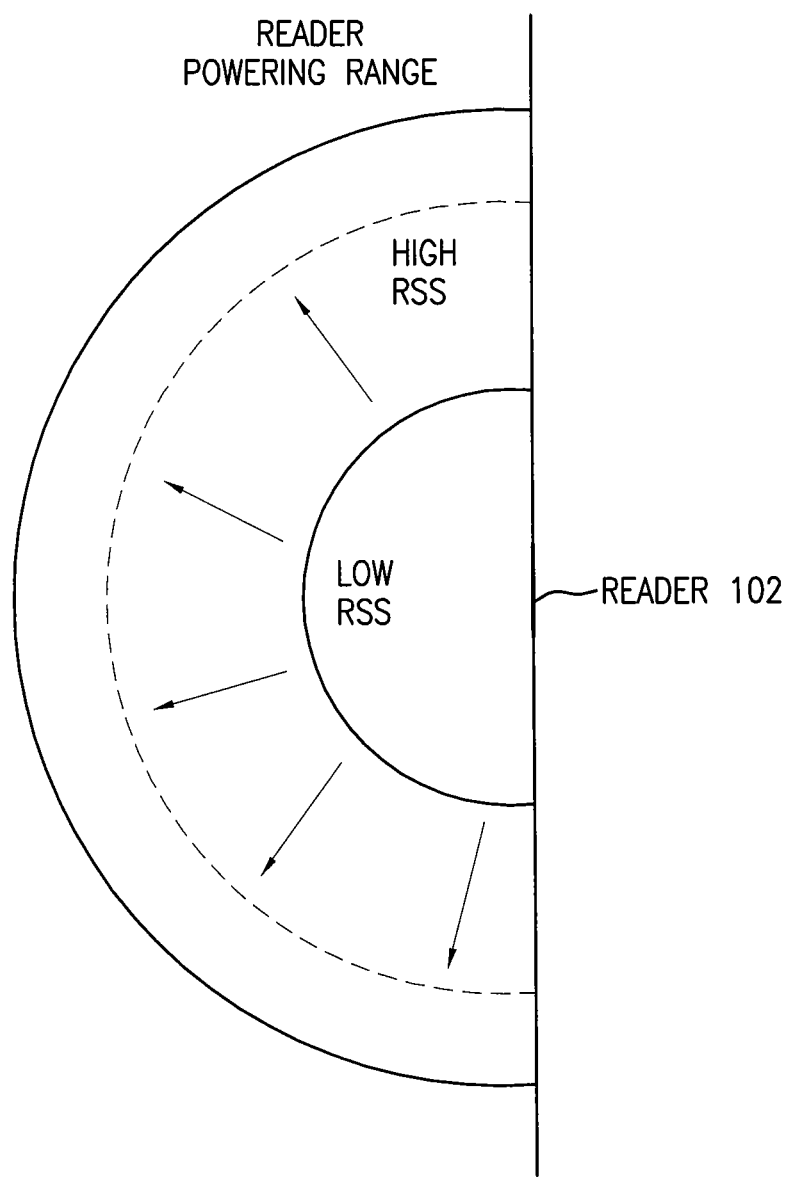
FIG. 2 is a diagram of a communication range in a reader having a low response signal strength level and a high response signal strength level.

FIG. 2 is a diagram of a communication range of reader 102 showing a low RSS level range and a high RSS level range. The low RSS level requires reader 102 to be highly sensitive to detect the modulated carrier signal of tag 104. Highly sensitive readers tend to be more expensive than less sensitive readers. As shown, the communication range of reader 102 can be increased by using a higher RSS level. This increased communication range permits the use of less sensitive readers which in turn drives down the cost of reader 102. While FIG. 2 depicts only a low RSS level and a high RSS level, any number of RSS levels can be included.

Figure 3:
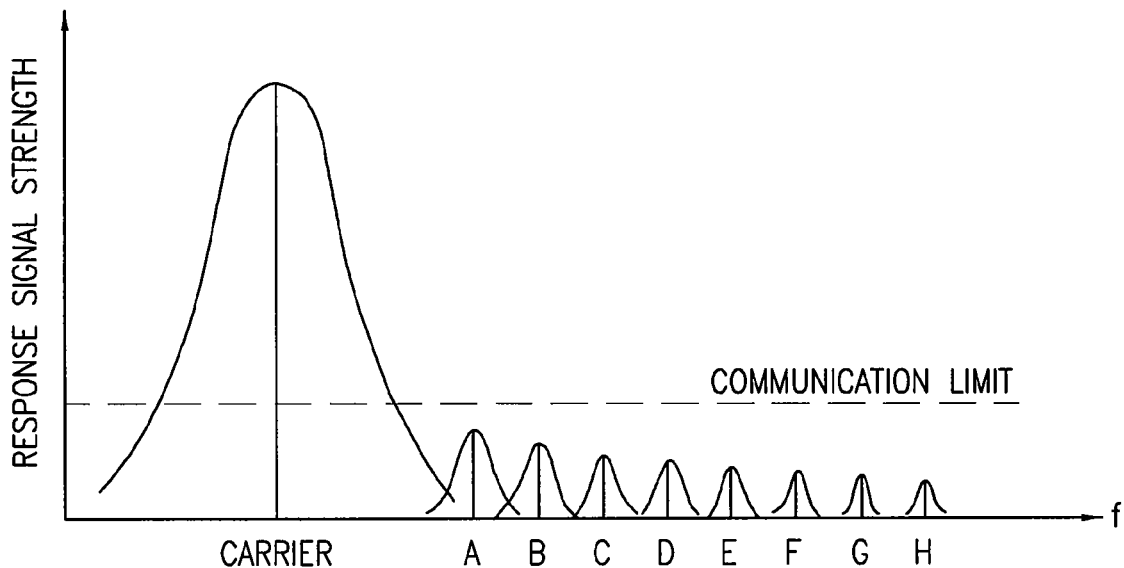
FIG. 3 is a signal diagram showing a carrier signal and channels having a low response signal strength level.

FIG. 3 is a signal diagram showing a carrier signal and channels A-H having a low RSS level. Here, the reader's 102 communication limit or minimum detectable channel amplitude, as illustrated by the horizontal dashed line, is greater than the each of the channels A-H. Accordingly, reader 102 is unable to communicate with any tags 104 over any of channels A-H using the low RSS level.

Figure 4:
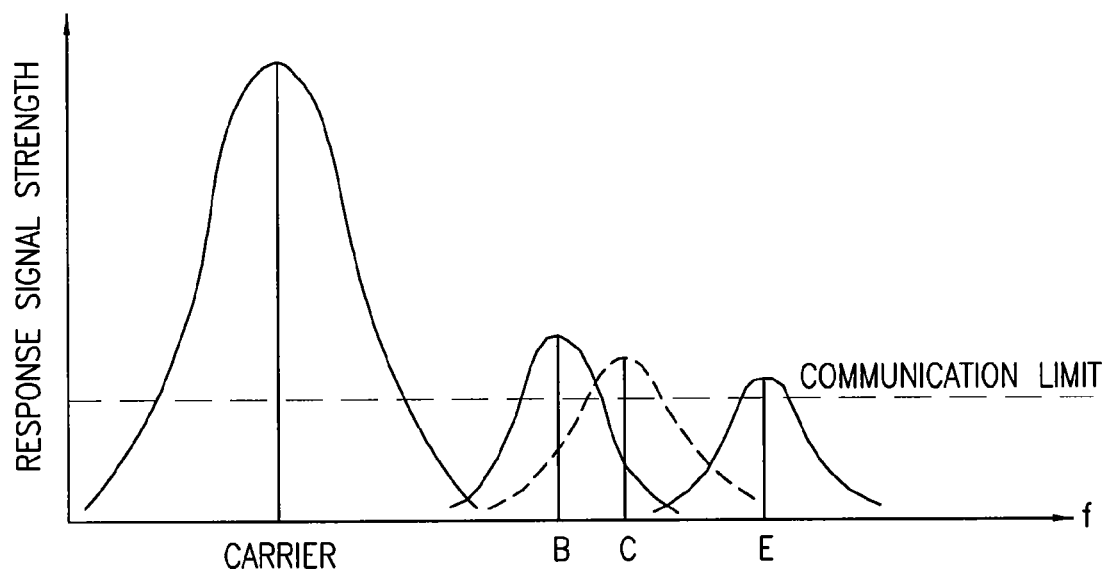
FIG. 4 is a signal diagram showing a carrier signal and channels having a higher response signal strength level as compared with that of FIG. 3.

FIG. 4 is a signal diagram showing the carrier signal and channels B, C, and E having a higher RSS level as compared with the channels depicted in FIG. 3. Here, reader 102 has selected a higher RSS level such that the amplitudes of signals over the channels are greater than the communication limit of reader 102. Accordingly, communication between reader 102 and tag 104 can be established using any channel where the RSS is higher than the communication limit.

In multi-channel systems, increasing RSS level can result in crosstalk, and thus use of simultaneous decodable channels should be avoided. In the case illustrated in FIG. 4, channel C should be avoided to limit crosstalk. In single channel modes where crosstalk is non-existent, increased RSS level can be used to increase the communication range between tag 104 and reader 102 without the risk of crosstalk, and without the need for the more sensitive and expensive reader 102.

Figure 5:
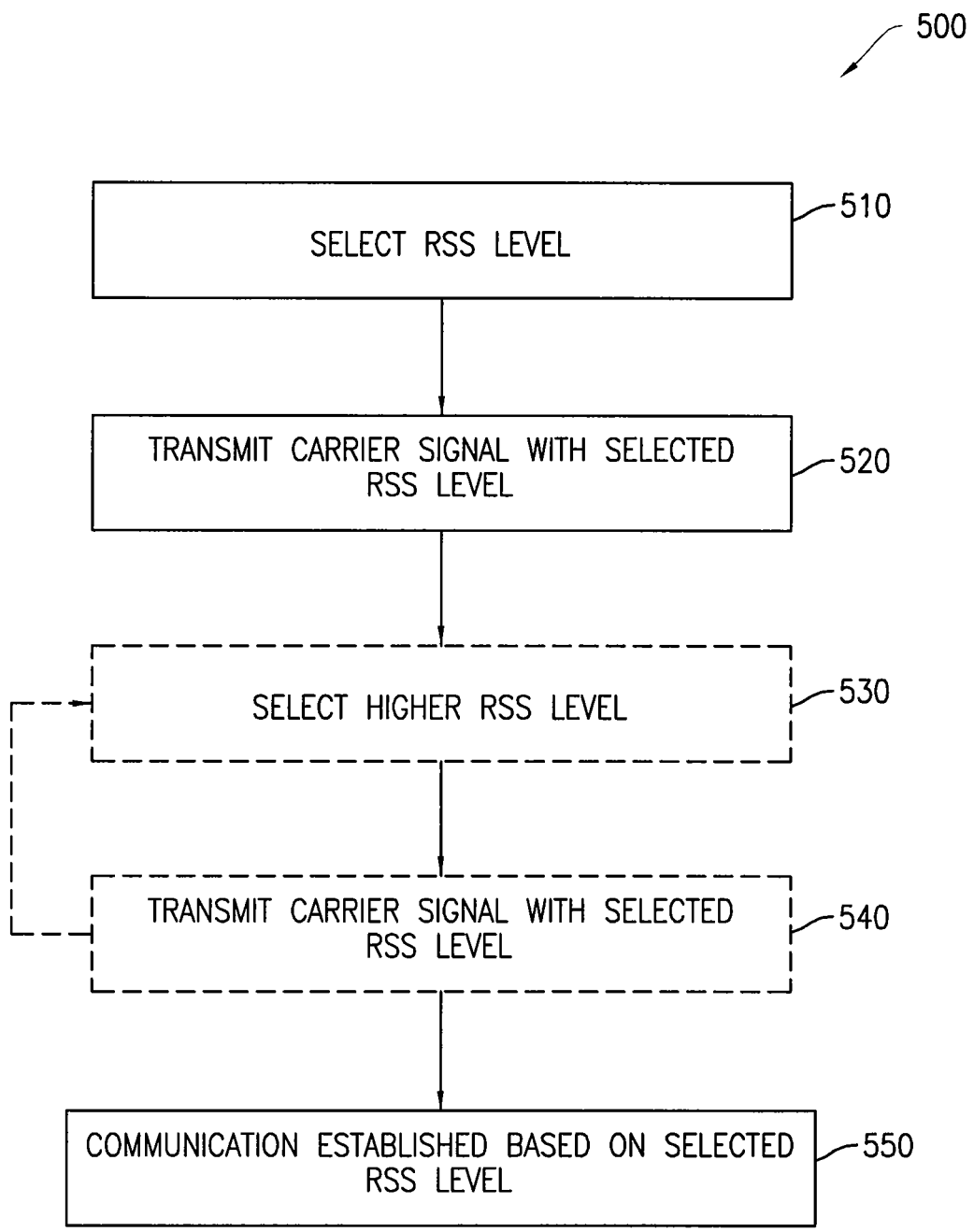
FIG. 5 is a flow chart illustrating a method of communication using selectable response signal strength levels in accordance with the present invention.

FIG. 5 is a flow chart illustrating a method of communication using selectable response signal strength levels in accordance with the present invention.

Reader 102 selects an RSS level from a plurality of RSS levels (step 510). In the case of a multi-channel system, reader 102 can select a separate RSS level for each channel.

Reader 102 transmits an interrogation or carrier signal 108 including a command flag or parameter that identifies the selected RSS level at which tag 104 should modulate and transmit the carrier signal 107 (step 520).

If reader 102 is not able to communicate with any tags 104 using the selected RSS level, reader 102 can select a higher RSS level (step 530). As a result of selecting a higher RSS level, the communication range of the reader 102 is increased. The reader 102 transmits the modulated carrier wave including a command flag or parameter that identifies the selected higher RSS level (step 540). In a form of negotiation with tags 104, reader 102 can repeat steps 530 and 540 to select progressively higher RSS levels until communication between reader 102 and at least one tag 104 can be established (step 550). Communication is established when tag 104 responds to the reader 102 by modulating and transmitting the carrier signal at the RSS level selected by the reader 102 and the reader 102 is able to decode the response. The modulation can be accomplished using any known wave shaping mode.

Reader 102 may communicate with tag 104 on different channels at the same or different RSS levels, with tag 104 responding on one channel at a time. Also, reader 102 may communicate with a plurality of tags 104 simultaneously on a plurality of channels, with the plurality of tags 104 responding respectively at the same or different RSS levels.

It should be appreciated that the invention is not limited to any particular number of RSS levels, or any difference between successive RSS levels. These parameters can be set as desired for a particular application or system design.

Establishing communication between reader 102 and tag 104 via selectable RSS levels can be performed simultaneously with an anti-collision method. Selection of a particular RSS level can permit optimization of the anti-collision method. For example, in single channel mode anti-collision is implemented as in multi-channel mode by muting tags 104 after identification by the reader. To avoid reply collisions when there is a large tag population, tags 104 reply on randomly selected channels. In single channel mode this anti-collision type leads to a long execution time because the tags randomly have to select the correct operation channel, that is one of, for example, eight channels. A selectable RSS level can be used to speed up this anti-collision process by selecting an appropriate RSS level for the operating channel.

Selectable RSS levels can be used for security applications. Reducing the RSS level to the lowest level at which communication is possible can avoid unauthorized parties from intercepting communications between reader 102 and tag 104.

As should be apparent from the description above, the present invention has many advantages. For example less sensitive, and thus less expensive, readers can be used. RSS can be optimized based on the number of operating channels. Rather than wideband antennas, narrowband antennas providing more magnetic field strength at the same power can be used. The anti-collision process can be optimized. System parameters such as range, antenna type, tag response-to-noise ratio, number of channels, etc., can be set to optimal values for each application. Variable modulation depth can be used to optimize performance in multi-channel systems.

The foregoing description is exemplary in nature and is not intended to limit the invention or the application and uses of the invention. For example, while the invention is described in the context of an RFID system, the invention is not necessarily limited in this respect. The invention may be applicable to any type of communication system in which communication between a reader and transceiver may be established by the reader selecting an RSS level from a plurality of selectable RSS levels.

While at least one exemplary embodiment has been presented in the foregoing detailed description, it should be appreciated that variations exist. It should also be appreciated that the exemplary embodiment or exemplary embodiments are only examples, and are not intended to limit the scope, applicability, or configuration of the invention in any way. One skilled in the art will appreciate that additional variations may be made in the above-described embodiment of the present invention without departing from the spirit and scope of the invention which is defined by the claims which follow.

The invention claimed is:

1. A communication method comprising:
   selecting a first non-zero response signal strength level for a first subset of a plurality of transceivers and a second non-zero response signal strength level for a second subset of the plurality of transceivers, by a reader transmitting a signal having a command that identifies the respective selected non-zero response signal strength levels to the subsets of the plurality of transceivers, and operating on a single response communication channel, wherein the first non-zero response signal strength level is within a desired communication range of the reader and the second non-zero response signal strength level is not within the desired communication range of the reader, and the first non-zero response signal strength level is greater than the second non-zero response signal strength level; and establishing communication between the reader and the first subset of the plurality of transceivers at the selected first non-zero response signal strength level,
wherein the communication method is performed simultaneously with an anti-collision method.

2. The communication method of claim 1, wherein if communication between the reader and at least one subset of the plurality of transceivers is not established, selecting a different response signal strength level for each of the subsets of the plurality of respective transceivers, by a reader transmitting another signal having another command that identifies the respective selected non-zero response signal strength levels to the subsets of the plurality of transceivers.

3. The communication method of claim 1, further comprising selecting progressively higher non-zero response signal strength levels, by a reader with each selection step transmitting a signal having a command that identifies the respective selected non-zero response signal strength levels to the subsets of the plurality of transceivers, until communication between the reader and at least one of the subsets of the plurality of transceivers is established.

4. The communication method of claim 1, wherein the plurality of transceivers are RFID tags.

5. The communication method of claim 1, wherein the reader operates in single channel mode.

6. The communication method of claim 1, wherein the reader communicates with plurality of transceivers using a narrow-band antenna.

7. The communication method of claim 1, wherein at least one of the selected non-zero response signal strength levels is a lowest level at which communication between the reader and at least one of the subsets of the plurality of transceivers is possible.

8. The communication method of claim 1, wherein the reader has a fixed carrier level.

9. The communication method of claim 1, wherein another subset of the plurality of transceivers has a response signal level/levels that is/are less than the one selected non-zero response signal level at which communication is established.

10. A communication method comprising:
selecting a first non-zero response signal strength level for a first subset of a plurality of transceivers and a second non-zero response signal level for a second subset of the plurality of transceivers, by a reader transmitting a signal having a command that identifies the respective selected non-zero response signal levels to the subsets of the plurality of transceivers,
wherein the first non-zero response strength level is within a communication range of the reader and the second non-zero response signal strength level is not within the desired communication range of the reader, and the first non-zero response strength level is greater than the second non-zero response signal strength level; and
establishing communication between the reader and the first subset of the plurality of transceivers at the selected first non-zero response signal strength level,
wherein the method is performed simultaneously with an anti-collision method, and the selection of the response signal strength levels permits optimization of the anti-collision method.

11. The communication method of claim 10, wherein another subset of the plurality of transceivers has a response signal level that is less than the one selected non-zero response signal level at which communication is established.

12. A reader comprising:
a processor configured to select a first non-zero response signal strength level for a first subset of a plurality of transceivers and a second non-zero response signal level for a second subset of the plurality of transceivers; and
a transmitter configured to transmit a first signal having a first command that identifies the respective non-zero response signal levels to the subsets of the plurality of respective transceivers,
wherein the first non-zero response signal strength level is within a desired communication range of the reader and the second non-zero response signal strength level is not within the desired communication range of the reader, the first non-zero response signal strength level being greater than the second non-zero response signal strength level, and
wherein the reader operates on a single response communication channel and is configured to perform the selection and transmission simultaneously with an anti-collision method.

13. The reader of claim 12, where the processor is further configured to select further respective non-zero response signal strength levels for the subsets of the plurality of transceivers and the transmitter is further configured to transmit a second signal having a second command that identifies the further non-zero response signal levels to the subsets of the plurality of transceivers if communication with at least one subset of the plurality of transceivers is not established in response to the first signal, wherein the further non-zero response signal strength levels are different from the first and second non-zero response signal levels.

14. The reader of claim 13, wherein the processor is further configured to select progressively higher non-zero response signal strength levels, with each selection transmitting a signal having a command that identifies the respective selected non-zero response signal strength levels to the respective subsets of the plurality of transceivers until communication between the reader and at least one of the subsets of the plurality of transceivers is established.

15. The reader of claim 13, further comprising a narrow band antenna configured to transmit and receive signals.

16. The reader of claim 12, wherein the selected first response signal strength level is a lowest level at which communication between the reader and at least one of the subsets of the plurality of transceivers is possible.

17. The reader of claim 12, wherein a subset of the plurality of transceivers has a response signal level that is less than the selected first non-zero response signal level.

18. A communication system comprising:
a plurality of transceivers; and
a reader configured to select a first non-zero response signal strength level for a first subset of the plurality of transceivers and a second non-zero response signal level for a second subset of the plurality of transceivers by the reader transmitting a signal having a command that identifies the respective selected non-zero response signal strength levels to the subsets of the plurality of transceivers, and to establish communication with the first subset of the plurality of transceivers at the selected first non-zero response signal strength level, wherein the first non-zero response signal strength level is within a desired communication range of the reader and the second non-zero response signal strength level is not within the desired communication range of the reader, the first non-zero response signal strength level being greater than the second non-zero response signal strength level, and wherein the reader operates on a single response communication channel and is configured to perform the selection and transmission simultaneously with an anti-collision method.

19. The communication system of claim 18, wherein the reader is further configured to select progressively higher non-zero response signal strength levels, with each selection the reader transmitting a signal having a command that identifies the respective selected non-zero response signal levels to the subsets of the plurality of transceivers, until communication between the reader and at least one of the subsets of the plurality of transceivers is established.

20. The communication system of claim 18, wherein the reader comprises a narrow band antenna configured to transmit and receive signals for establishing communication with at least one of the subsets of the plurality of transceivers.

21. The communication system of claim 18, wherein the one of the selected non-zero response signal strength levels is a lowest level at which communication between the reader and at least one of the subsets of the plurality of transceivers is possible.

22. The communication system of claim 18, wherein another subset of the plurality of transceivers has a response signal level that is less than the selected first non-zero response signal level at which communication is established.

* * * * *